(12) United States Patent
Streppel

(10) Patent No.: US 10,955,111 B2
(45) Date of Patent: Mar. 23, 2021

(54) LENS AND LAMP HAVING A LENS

(71) Applicant: OSRAM Opto Semiconductors GmbH, Regensburg (DE)

(72) Inventor: Ulrich Streppel, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 198 days.

(21) Appl. No.: 16/303,513

(22) PCT Filed: May 17, 2017

(86) PCT No.: PCT/EP2017/061872
§ 371 (c)(1),
(2) Date: Nov. 20, 2018

(87) PCT Pub. No.: WO2017/202670
PCT Pub. Date: Nov. 30, 2017

(65) Prior Publication Data
US 2020/0271297 A1 Aug. 27, 2020

(30) Foreign Application Priority Data

May 25, 2016 (DE) ...................... 10 2016 109 647.4

(51) Int. Cl.
*G02B 3/08* (2006.01)
*F21V 5/04* (2006.01)
*G03B 21/14* (2006.01)

(52) U.S. Cl.
CPC ................ *F21V 5/045* (2013.01); *G02B 3/08* (2013.01); *G03B 21/145* (2013.01)

(58) Field of Classification Search
CPC ......... G03B 21/145; F21V 5/045; G02B 3/08; G02B 3/02
(Continued)

(56) References Cited

U.S. PATENT DOCUMENTS 4,823,246 A * 4/1989 Dilouya .................. F21S 43/40
362/328
4,900,129 A * 2/1990 Vanderwerf ............. G02B 3/08
359/742

(Continued)

FOREIGN PATENT DOCUMENTS

| CN | 101676616 A | 3/2010 |
|---|---|---|
| KR | 10-1362186 B1 | 2/2014 |
| WO | 2015/003851 A1 | 1/2015 |

*Primary Examiner* — William R Alexander
(74) *Attorney, Agent, or Firm* — DLA Piper LLP (US)

(57) ABSTRACT

A lens that spreads light from a point light source includes a light entry side having a first Fresnel structure, a light exit side having a second Fresnel structure different from the first Fresnel structure, a section plane located entirely between the first and second Fresnel structures so that the lens is flat, and a central axis as an optical axis perpendicular to the section plane, wherein a height of Fresnel rings of the first Fresnel structure, referred to the section plane, increases in the direction away from the central axis, the Fresnel rings of the first Fresnel structure each have an entry surface facing towards the central axis and a deflecting surface facing away from the central axis, and Fresnel rings of the second Fresnel structure each have a mirror surface facing towards the central axis and an exit surface facing away from the central axis.

15 Claims, 4 Drawing Sheets

(58) Field of Classification Search
USPC .......................................................... 359/742
See application file for complete search history.

(56) References Cited

U.S. PATENT DOCUMENTS

| | | | |
|---|---|---|---|
| 5,676,453 A | 10/1997 | Parkyn, Jr. et al. | |
| 6,755,556 B2* | 6/2004 | Gasquet | F21S 43/315 |
| | | | 362/329 |
| 7,158,298 B2* | 1/2007 | Miyata | G03B 21/10 |
| | | | 359/453 |
| 7,857,619 B2* | 12/2010 | Liu | G02B 3/08 |
| | | | 433/29 |
| 8,727,580 B2* | 5/2014 | Takayama | F21V 5/045 |
| | | | 362/333 |
| 9,534,761 B2* | 1/2017 | Harada | F21V 5/045 |
| 2003/0075167 A1* | 4/2003 | Minano Dominguez | |
| | | | G01J 1/0411 |
| | | | 126/680 |
| 2005/0024746 A1* | 2/2005 | Shimura | F21V 5/045 |
| | | | 359/742 |
| 2008/0092879 A1* | 4/2008 | Minano Dominguez | |
| | | | G02B 3/08 |
| | | | 126/699 |
| 2013/0051029 A1 | 2/2013 | Suzuki et al. | |
| 2014/0078468 A1 | 3/2014 | Bublitz et al. | |
| 2014/0211469 A1* | 7/2014 | Huang | F21V 5/007 |
| | | | 362/246 |
| 2016/0246161 A1* | 8/2016 | Wang | G03B 15/05 |
| 2016/0363288 A1* | 12/2016 | McKendry | F21V 5/007 |

\* cited by examiner

LENS AND LAMP HAVING A LENS

TECHNICAL FIELD

This disclosure relates to a lens and a luminaire comprising such a lens.

BACKGROUND

A Fresnel lens for a projector is disclosed in U.S. Pat. No. 4,900,129 A. US 2005/0024746 A1 discloses a Fresnel lens in a luminaire having an LED as the light source. There is nonetheless a need to provide a lens by which a large angular range can be efficiently illuminated, the lens simultaneously having a low overall height.

SUMMARY

I provide a lens that spreads light from a point light source including a light entry side having a first Fresnel structure, a light exit side having a second Fresnel structure different from the first Fresnel structure, a section plane located entirely between the first and second Fresnel structures so that the lens is flat, and a central axis as an optical axis perpendicular to the section plane, wherein a height of Fresnel rings of the first Fresnel structure, referred to the section plane, increases in the direction away from the central axis, the Fresnel rings of the first Fresnel structure each have an entry surface facing towards the central axis and a deflecting surface facing away from the central axis, and Fresnel rings of the second Fresnel structure each have a mirror surface facing towards the central axis and an exit surface facing away from the central axis.

I also provide a luminaire including the lens, and a light-emitting LED chip as a point light source with an average edge length, wherein the point light source is located on the central axis on the light entry side, and along the central axis, a distance between the light entry side and the point light source is at least 20% and at most 90% of the average edge length.

LIST OF REFERENCE SIGNS

Figure 1A:
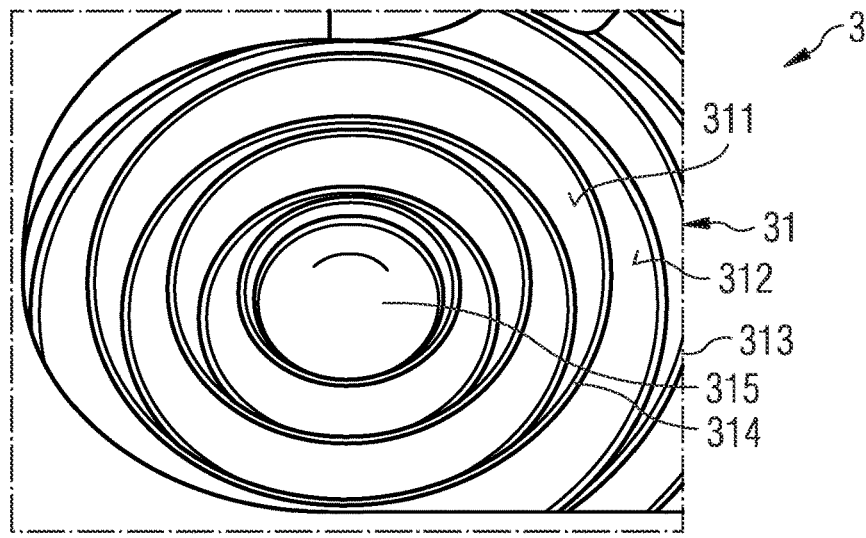
FIGS. 1A, 1B, 1C and 2A and 2B show schematic illustrations of examples of lenses described here.

1 Luminaire
2 Point light source, LED chip
21 Main emission side
22 Side surface
23 Semiconductor region
24 Chip substrate
25 Fluorescent layer
3 Lens
31 Light entry side having the first Fresnel structure
311 Entry surface
312 Deflecting surface
313 Fresnel rings of the first Fresnel structure
314 Tip of the Fresnel rings of the first Fresnel structure
315 Converging lens
32 Light exit side having the second Fresnel structure
321 Mirror surface
322 Exit surface
323 Fresnel rings of the second Fresnel structure
324 Tip of the Fresnel rings of the second Fresnel structure
325 Optically inactive zone
33 Section plane
34 Central axis/optical axis
35 Mounting socket
4 Image recording device
5 Assembly platform
6 Bonding wire
A Illumination field
d Distance tip-central axis
h Height of the tips
D Edge length of the LED chip
L Light
M. Size
R. Radius

DETAILED DESCRIPTION

My lens may be formed for a point light source. A point light source means, for example, that when viewed from above, a light emitting surface of the point light source is smaller than a light-entry surface of the lens. For example, in a plan view, an average diameter of the lens is at least three or five times or eight or twelve times the average diameter of the point light source.

The lens may be configured to spread light. This can mean that a beam angle of the point light source is enlarged compared to a situation without a lens. Furthermore, this preferably means that the lens is not configured to image the point light source in an optical near field and/or in an optical far field. From the lens, the light of the point light source is thus emitted over a large spatial angle range in a homogeneously distributed manner.

The lens may have a light entry side having a first Fresnel structure. Likewise, the lens may have a second Fresnel structure on one light exit side opposite the light entry side and facing away from the point light source as intended. In other words, the lens is a double Fresnel lens. The Fresnel structures are preferably formed by Fresnel rings.

A section plane of the lens may lie entirely between the first and second Fresnel structures. Thus, the section plane between the light entry side and the light exit side lies preferably exclusively in a material of the lens. The section plane does not cut and/or touch either the light entry side or the light exit side. Since the section plane lies entirely between the light entry side and the light exit side, the lens is a flat lens. This may also mean that a thickness of the lens, referred to an optically active region, is not more than 70% or 50% or 30% or 20% of the mean diameter of the optically active region. The optically active region is the area of the lens that is configured to guide and direct the light, as intended.

The lens may have a central axis. The central axis is preferably an optical axis of the lens. Furthermore, the central axis is preferably oriented perpendicular to the section plane.

The first Fresnel structure may differ from the second Fresnel structure. In particular, the Fresnel structures are not symmetrical to the section plane. Furthermore, the Fresnel structures can have different Fresnel rings having different heights, cross-sectional shapes and/or diameters.

A height of the Fresnel rings of the first Fresnel structure at the light entry side may increase in the direction away from the central axis. The height refers to a distance from a tip of the associated Fresnel ring to the section plane or to a point of the light entry side closest to the section plane. This applies in particular when viewed in a cross section perpendicular to the section plane. In other words, the farther the Fresnel rings extend away from the section plane, the farther the corresponding Fresnel ring is away from the central axis.

The Fresnel rings may be circular when viewed from above. Preferably, a center point of the circles formed by the Fresnel rings lies on the central axis, for instance within a tolerance of at most 10% or 5% or 2% of the diameter of the associated Fresnel ring. This can apply to the Fresnel rings on the light entry side and on the light exit side.

The Fresnel rings of the first Fresnel structure may each have an entry surface facing the central axis and a deflecting surface facing away from the central axis. Here, for its intended use, the deflecting surface is configured to totally reflect light originating from the point light source. The light entry surface is configured so that the light from the point light source enters the lens through this surface.

At the light exit surface, the Fresnel rings of the second Fresnel structure may each have a mirror surface facing towards the central axis and an exit surface facing away from the central axis. The mirror surface is formed for light experiencing total reflection, wherein it is also possible for a small proportion of radiation to escape through the mirror surface. The mirror surface is arranged optically directly downstream of the deflecting surface. Most of the radiation entering the Fresnel lens via the entry surface is emitted from the lens at the exit surface. To a small extent, the exit surface can also have a total reflective effect and redirect a small fraction of radiation coming from the deflecting surface towards the mirror surface so that this fraction of radiation then exits the lens via the mirror surface.

The first and second Fresnel structures may each have the same number of Fresnel rings. In particular, for each Fresnel ring of the first Fresnel structure, there is a one-to-one assignment to a Fresnel ring of the second Fresnel structure, and vice versa.

The lens may be configured to spread light from a point light source. The lens includes a light entry side having a first Fresnel structure and a light exit side having a second Fresnel structure. The first Fresnel structure is different from the second Fresnel structure. A section plane of the lens lies entirely between the first and second Fresnel structures so that the lens is flat. A central axis of the lens preferably forms an optical axis and is oriented perpendicular to the section plane. A height of the Fresnel rings of the first Fresnel structure, referred to the section plane, increases in the direction away from the central axis. The Fresnel rings of the first Fresnel structure each have an entry surface facing towards the central axis and a deflecting surface facing away from the central axis. The Fresnel rings of the second Fresnel structure each have a mirror surface facing towards the central axis and an exit surface facing away from the central axis.

Camera systems in mobile devices such as smartphones show a trend towards ever-increasing fields of view, including wide-angle cameras and fisheye cameras. This means for flash lighting units that a large angular range has to be illuminated. This needs to be achieved for mobile devices such as smartphones that have very low installation heights in the range of a few millimeters, since the installation space in such mobile devices is very limited and a further reduction in the available installation space, especially with regard to the thickness of the lens, is to be expected in the future. Using conventional Fresnel lenses, the problem with large beam angles is that a critical angle for internal total reflection, which occurs within the lens, is not reached and as a result of this the lens suffers from large loss of efficiency.

Using my lens, on the other hand, high efficiency can be obtained in a large beam angle and a small required installation space. Furthermore, my lens can also be manufactured using processes for large quantities such as injection molding. This is achieved by the first and second Fresnel structures on the light entry side and on the light exit side, which are accordingly adjusted with respect to each other.

In virtue of the Fresnel rings on the light entry side, light from the point light source may be collected efficiently. A tilting angle of the Fresnel rings, especially of the deflecting surface, is so large that incident light is safely guided above a critical angle for total reflection. In addition, the light is focused by a concave curvature of the mirror surface on the light exit side.

The entry surface of the first Fresnel structure may have a convex curvature so that the incident light collimates towards the mirror surface. This allows the light to be emitted at large angles. Furthermore, an incidence of radiation onto the deflecting surface of the second Fresnel structure occurs largely above the critical angle for total reflection.

In each case an optically inactive zone may be located between adjacent Fresnel rings of the second Fresnel structure. The optically inactive zone is formed, for example, by a surface oriented parallel or approximately parallel to the section plane. In particular, the optically inactive zones are each formed by a circular ring-shaped surface.

The widths of the optically inactive zones may increase in the direction away from the central axis. In other words, the farther these Fresnel rings are from the central axis, the greater the distance is between adjacent Fresnel rings of the second Fresnel structure.

The second Fresnel structure may have a further optically inactive zone. The further optically inactive zone is preferably pierced by the central axis. For example, the further optically inactive zone is a circular surface completely enclosed by the innermost Fresnel ring of the second Fresnel structure. The further optically inactive zone can be oriented parallel to the section plane. As an alternative to such a centrally located optically inactive zone, the region within the innermost Fresnel ring of the second Fresnel structure can be lens-shaped, for example, in the form of a diffusing lens or a converging lens.

The tips of the Fresnel rings of the first Fresnel structure may be located in the region of the optically inactive zones when these tips are projected parallel to the central axis onto the optically inactive zones. In other words, in a plan view of the light exit surface, the tips of the Fresnel rings of the first Fresnel structure are located below the optically inactive zones between the Fresnel rings of the second Fresnel structure.

In a cross-sectional view, the deflecting surfaces may be convex curved. Thus, the deflecting surfaces have a converging lens effect on the light coming from the point light source, similar to a concave mirror.

The mirror surfaces may be concave curved. Thus, the mirror surfaces act as diffusing lenses on the radiation coming from the deflecting surface, which is reflected at the mirror surface.

As seen in a cross section perpendicular to the cut surface and along the central axis, the entry surface and the exit surface may be formed by straight lines. This means that, when viewed in cross section, the entry and exit surfaces can be free of curvatures. Alternatively, it is possible for the entry surface and/or the exit surface to have curvatures, when seen in cross section.

Some, most or all transitions between adjacent surfaces of the lens may be rounded. Due to the rounding, a more efficient production, for example, in an injection molding process is achieved.

The rounding radii between adjacent surfaces are at least 5 µm or 10 µm and/or at most 50 µm or 30 µm or 20 µm. The rounding radii are particularly preferred to be at a maximum of 20% or 10% or 5% of an average height of the nearest Fresnel ring.

A diameter of the light entry side is at least 1 mm or 2 mm or 3 mm. Alternatively or additionally, the maximum diameter is 10 mm or 8 mm or 6 mm. In the direction perpendicular to the section plane and referred to the optically active region of the lens, a thickness of the lens is preferably at least 0.1 mm or 0.3 mm and/or at most 2 mm or 1 mm or 0.8 mm.

The tips of the Fresnel rings of the first Fresnel structure may be located in a common plane, especially parallel to the section plane. In other words, the Fresnel rings of the second Fresnel structure have a constant height.

On the light entry side, the heights of the Fresnel rings of the first Fresnel structure may increase in the direction away from the central axis in accordance with a square function, i.e. like a parabola. This applies preferably within a tolerance of at most 10% or 5% of the height of the respective Fresnel ring.

I also provide a luminaire. The luminaire comprises one or more lenses as specified in conjunction with at least one of the previous examples. Features of the lens are therefore also disclosed for the luminaire and vice versa.

The luminaire may comprise one or a plurality of light emitting LED chips. The point light source is realized by at least one, preferably by exactly one LED chip. The LED chip and thus the point light source has an average edge length, hereinafter referred to as D. If the edges of the LED chip are of different lengths, particularly in a plan view of the main emission side of the LED chip, the mean edge length is the mean value of all edge lengths. If the LED chip at least partially has a round shape, an average diameter can be used instead of the average edge length.

The point light source may be located in the central axis of the lens on its light entry side. Within the manufacturing tolerances, a geometric center point of the main emission side of the LED chip is located preferably on the central axis.

The point light source, in particular the main emission side of the LED chip, may be located close to the light entry side of the lens. In particular, a distance between the light entry side and the point light source along the central axis is at least 10% or 20% or 25% and/or at most 90% or 60% or 40% of the mean edge length.

The following relationship may apply to the heights h of the individual Fresnel rings of the first Fresnel structure, referred to a distance d in the direction away from the central axis and referred to the mean edge length D: $h(d)=0.12(d/D)^2+0.06(d/D)$. In particular, this relationship applies within a tolerance of at most 10% or 5% of the mean edge length D.

For a distance Vn of the n-th tip of the Fresnel rings of the first Fresnel structure and for a distance Wn of the n-th tip of the Fresnel rings of the second Fresnel structure, the following relationships or at least one of these relationships may apply:

$$Vn=(0.1+0.3n)D\pm0.05D;$$

$$Wn=(0.4+0.4n+0.14n^2)D\pm0.05D.$$

Here, n is a natural number 1 to 6, in particular n=3 or n=4; the distances Vn and Wn are preferably determined in the direction perpendicular to the central axis.

An area on the light entry side within the first Fresnel ring of the first Fresnel structure may be formed by a converging lens. The converging lens is pierced by the central axis. A maximum height of the converging lens, relative to the section plane, is preferably smaller than the height of the innermost Fresnel ring of the first Fresnel structure. In particular, the intersection point of the converging lens and the central axis is located on the same parabola as the tips of the Fresnel rings of the first Fresnel structure.

A distance between the outermost Fresnel ring of the first Fresnel structure and a main emission side facing the light entry side may be at least 5% or 10% and/or at most 25% or 10% of the mean edge length measured in the direction parallel to the central axis. The tip of the outermost Fresnel ring may be farther away from the section plane than the main emission side of the point light source, or the main emission side is located farther away from the section plane than the tip of the outermost Fresnel ring.

The point light source and thus the LED chip may have a Lambertian radiation characteristic on the main emission side. An intensity I radiated at an angle α is therefore Imax cos α, where Imax is the intensity emitted along the central axis. This relationship applies preferably within a tolerance of at most 0.05 Imax or 0.1 Imax.

During operation of the point source, the Fresnel rings of the second Fresnel structure may radiate the same luminous flux. This applies preferably within a relative mutual deviation of at most 20%. Relative deviation means, for example, that a quotient of the two to-be-considered variables may be 1+/−0.2 in a tolerance of 20%=0.2. Preferably, this relative deviation is at most 10%. The deviation applies in particular to all Fresnel rings of the second Fresnel structure in pairs.

The lens may have a mounting socket. Together with an assembly platform for the point light source, for example, a circuit board or a mounting plane in a smartphone housing, the lens completely encloses the point light source all around. Thus, the lens can serve as a housing and/or as a cover for the point light source.

The luminaire may be built into a mobile image recording device, wherein the image recording device is in particular a smartphone or mobile phone or also a portable computer or tablet.

The luminaire may serve as a flashlight. In particular, the luminaire is configured for a pulsed operation.

The point light source may be composed of a semiconductor region on a chip substrate, followed by at least one fluorescent layer. In this case, the main emission side may be formed by a side of the fluorescent layer facing the lens.

The point light source may be formed by several LED chips, for example, by two, three or four LED chips. Preferably, the LED chips are individually controllable and arranged only at a small distance from each other. A color location of the light emitted by the luminaire is adjustable by using several LED chips. In a flashlight, the emitted light can be adjusted to an ambient light, in particular for increasing image quality.

In the following, a lens described here and a luminaire described here are explained in more detail with reference to the drawings in accordance with examples. Identical reference numerals indicate identical elements in the individual figures. The illustrated sizes, however, are not necessarily true to scale and individual elements can rather be illustrated exaggeratedly large for the purpose of better clarification.

Figure 1B:
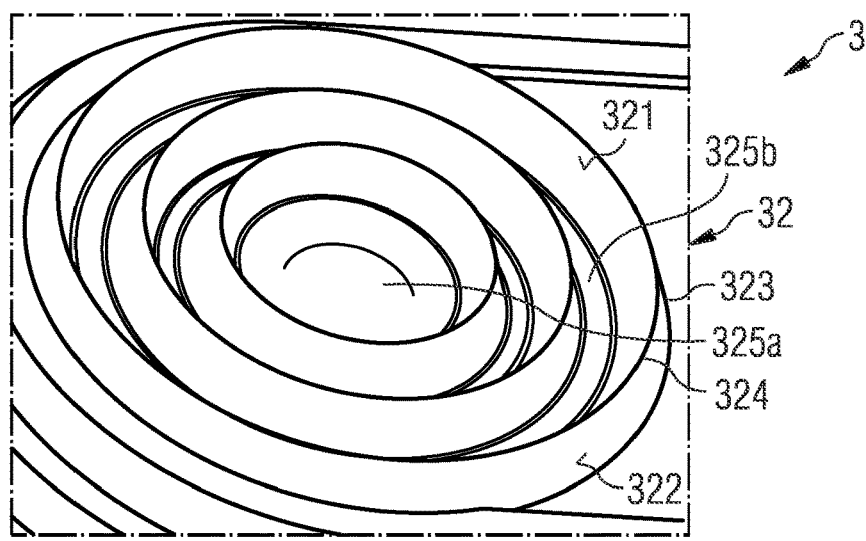
Figure 1C:
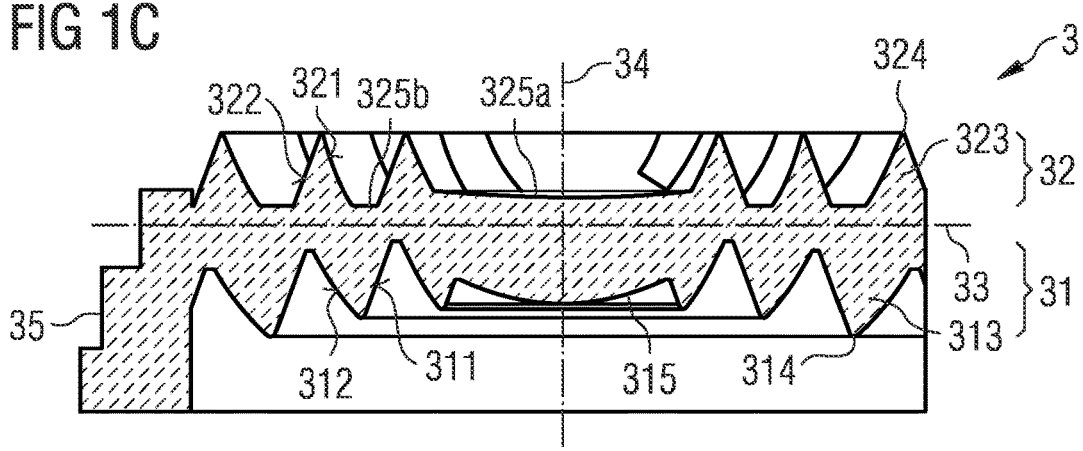

FIG. 1 schematically shows a lens 3, see the perspective views in FIGS. 1A and 1B and the sectional view in FIG. 1C.

Figure 3:
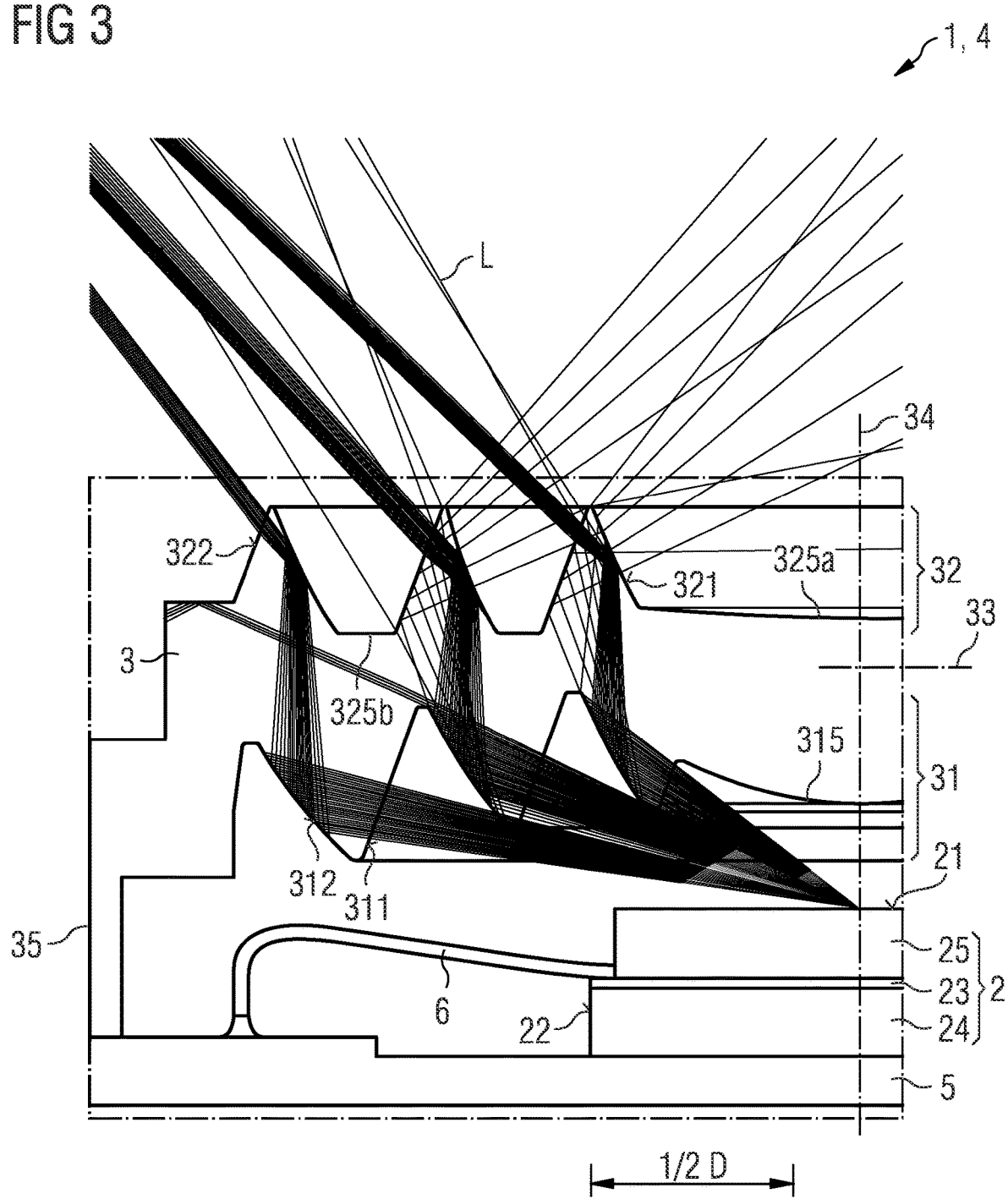
FIGS. 3 and 4A show illustrations of examples of luminaires.

The lens 3 comprises a light entry side 31 having a first Fresnel structure and a light exit side 32 having a second Fresnel structure. The lens 3 is a flat lens so that a section plane 33 is located entirely between the light entry side 31 and the light exit side 32 and does not cut or touch it/them. The section plane 33, as shown in FIG. 1C, is perpendicular to the drawing plane. Furthermore, the section plane 33 is oriented perpendicular to a central axis 34 of the lens 3. The central axis 34 preferably represents an optical axis of the lens 3. The lens 3 is configured to be mounted above a point light source 2, wherein the point light source 2 may be located centrally on the central axis 34 as shown in FIG. 3.

In a central region around the central axis 34, the light entry side 31 is formed by a converging lens 315. In the direction away from the central axis 34, the converging lens 315 is adjoined by a region having several Fresnel rings 313. The farther the associated Fresnel ring 313 is spaced apart from the central axis 34, the farther the tips 314 of the Fresnel rings 313 are away from the section plane 33. All transitions between neighboring surfaces are rounded. The tips 314 separate the entry surfaces 311 from the deflecting surfaces 312 of the respective Fresnel ring 313.

The light exit side 32 is also formed by several Fresnel rings 323. Tips 324 of these Fresnel rings 323 lie in a common plane parallel to the section plane 33. These tips 324 lie between the mirror surfaces 321 and the exit surfaces 322 of the respective Fresnel rings 323. Preferably, a difference in diameters of the corresponding Fresnel rings 313, 323 on the light entry side 31 and the light exit side 32 increases particularly from the inside outwards.

Between each of the neighboring Fresnel rings 323, there is a circular-area-shaped optically inactive zone 325b. Widths of these zones 325b increase in the direction away from the central axis 34. Viewed in cross section as shown in FIG. 1C, the optically inactive zones 325b are oriented parallel to the section plane 33.

A further optically inactive zone 325a is located in the central area inside the innermost Fresnel ring 323 on the light exit side 32. The circular, further optically inactive zone 325a is oriented parallel to the section plane 33, but is located farther away from the section plane 33 than the optically inactive zones 325b.

The lens 3 has a mounting socket 35 at one edge located outside the optically effective light entry side 31 and light exit side 32. Via the mounting socket 35, which preferably runs fully around the lens 3, the lens 3 can be attached to an external carrier, for example, by gluing, screwing or hooking.

FIG. 3 shows a luminaire 1 having such a lens 3. The luminaire 1 is located in an image recording device 4, for example, in a smartphone. In addition to the lens 3, the luminaire 1 comprises a point light source 2 formed by an LED chip. The LED chip 2 comprises a chip substrate 24 on which a semiconductor region 23 having an active zone (not shown here) for generation of radiation is grown or attached. Optionally, a fluorescent layer 25 is located on the semiconductor region 23 and faces towards the light entry side 31. A main emission side 20 of the LED chip 2 is thus formed by the fluorescent layer 25. At the main emission side 21, approximately Lambertian light L is radiated. According to FIG. 3, no or no significant light is radiated at side surfaces 22 of the point light source 2.

Furthermore, FIG. 3 schematically shows individual beam paths of light L incident on the Fresnel rings 313, 323. The light L is coupled into the Fresnel rings 313 of the first Fresnel structure via the entry surfaces 311 and totally reflected at the deflecting surfaces 312 and directed towards the Fresnel rings 323 at the light exit side 32. At the mirror surfaces 321 arranged optically directly downstream of the deflecting surfaces 312 of the associated Fresnel ring 313 at the light entry side 31, the light L is deflected towards the exit surfaces 322. Light is reflected to a small extent at the exit surfaces 322 towards the mirror surfaces 321 and coupled out at the mirror surfaces 321. The deflecting surfaces 312 have a focusing effect and are therefore convex curved, the mirror surfaces 321 are concave curved and have a divergent effect on the light L.

The LED chip 2 having the mean edge length D is electrically contacted to an assembly platform 5 via a bonding wire 6. The lens 3 is also attached to the assembly platform 5 via the mounting socket 35. Thus, the LED chip 2 is also enclosed by the lens 3 at the same time.

In contrast to the illustration in FIG. 3, several point light sources 2 arranged close together in a region below the converging lens 315 may also be present. Furthermore, it is alternatively possible that the point light source 2 emits radiation at the side surfaces 22, for example, in the case of a sapphire chip having a semiconductor layer sequence made of AlInGaN. If a significant proportion of radiation is radiated at the side surfaces 22, it is preferred that additional Fresnel teeth 313, 323 located farther outwards are present which reach closer to the assembly platform 5. Tips 314 of such Fresnel rings 313 at the light entry side 31 can be farther away from the section plane 33 than the main emission side 21. Thus, in contrast to FIG. 3, it is possible for the Fresnel rings 313 to partially cover the side surfaces 22 in the direction parallel to the section plane 33.

Figure 2A:
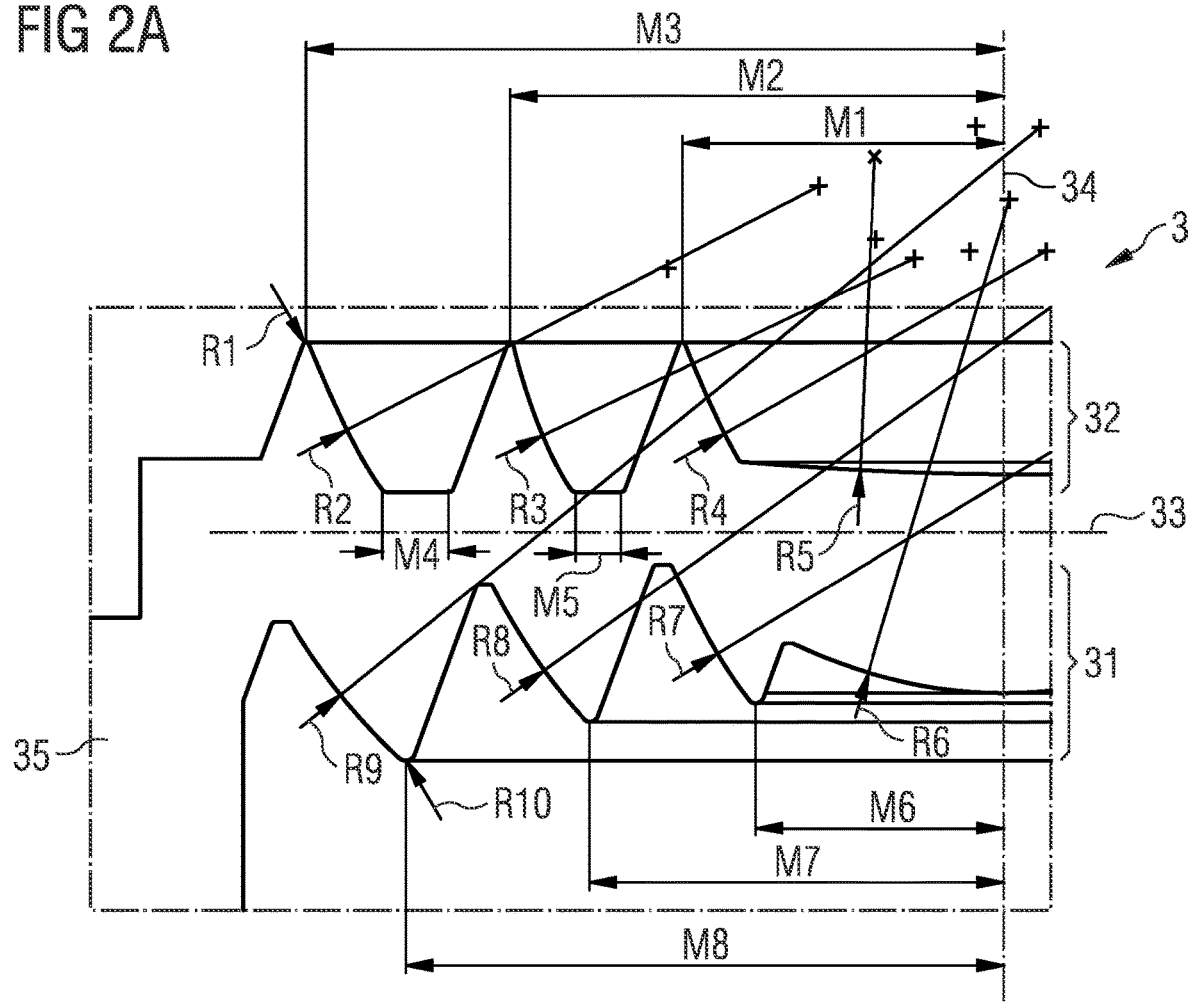
Figure 2B:
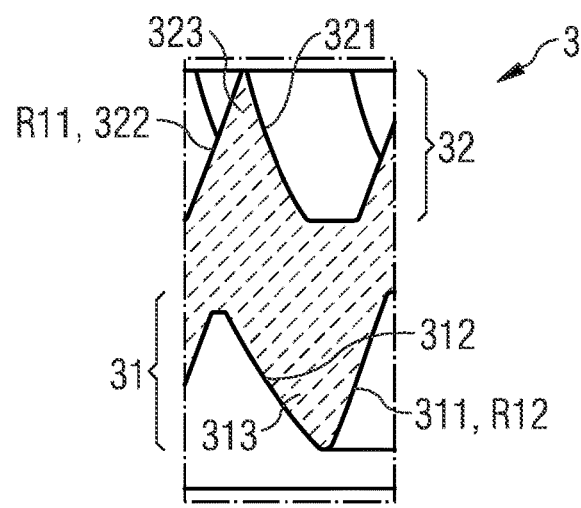

FIG. 2A shows another sectional view of the lens 3 as also shown in the detailed illustration in FIG. 2B. Also preferably in all other examples, all tips 314 of the Fresnel rings 313 on the light entry side 31 are located on a common parabola, together with a piercing point of the central axis 34 through the central converging lens 315.

In the following, as an example, the sizes M and the radii R of the lens 3 are illustrated. The values apply to an average edge length D of 0.75 mm. All values are given in millimeters. Preference is given to the values being within a tolerance of 25% or 10% or 5% or less. The provided values shall be scaled linearly with the mean edge length D. For example, if the mean edge length D is 1.5 mm instead of 0.75 mm, all the above sizes have to be doubled. In other words, the provided values have to be changed proportionally with the actual mean edge length D, wherein the aforementioned tolerances may be present in each case.

For D=0.75 mm, for example, the following sizes are available: M1=0.39; M2=0.61; M3=0.85; M4=0.07; M5=0.05; M6=0.30; M7=0.51; M8=0.73. The following applies to the radii of curvature: R1=0.01 as preferred for all other rounded shapes on the light exit side 32; R2=0.65; R3=0.50; R4=0.45; R5 is preferably infinite; R6=0.60; R7=0.89; R8=0.89; R9=1.09; R10=0.02 as preferred for all other rounded shapes on the light entry side 31.

The radii R11 and R12 as shown in FIG. 2B are preferably infinite. The radius of curvature of the deflecting surface 312 is preferably 0.9 times to 1.5 times the mean edge length D. The radius of curvature of the mirror surface 321 is preferably 0.4 times to 1 times the mean edge length D of the point light source 2.

Figure 4A:
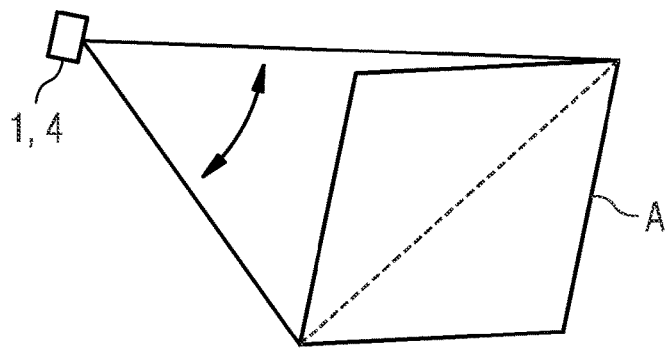

FIG. 4A schematically shows another example of the luminaire 1 and an image recording device 4 in perspective. By the luminaire 1, an illumination field A is illuminated. The illumination field A is preferably an approximately rectangular area, for example, having an aspect ratio of 4:3 or 16:9. A diagonal angle of the illumination field A is preferably at least 70° or 80°, relative to luminaire 1. According to FIG. 4A, the diagonal angle is 83°.

Figure 4B:
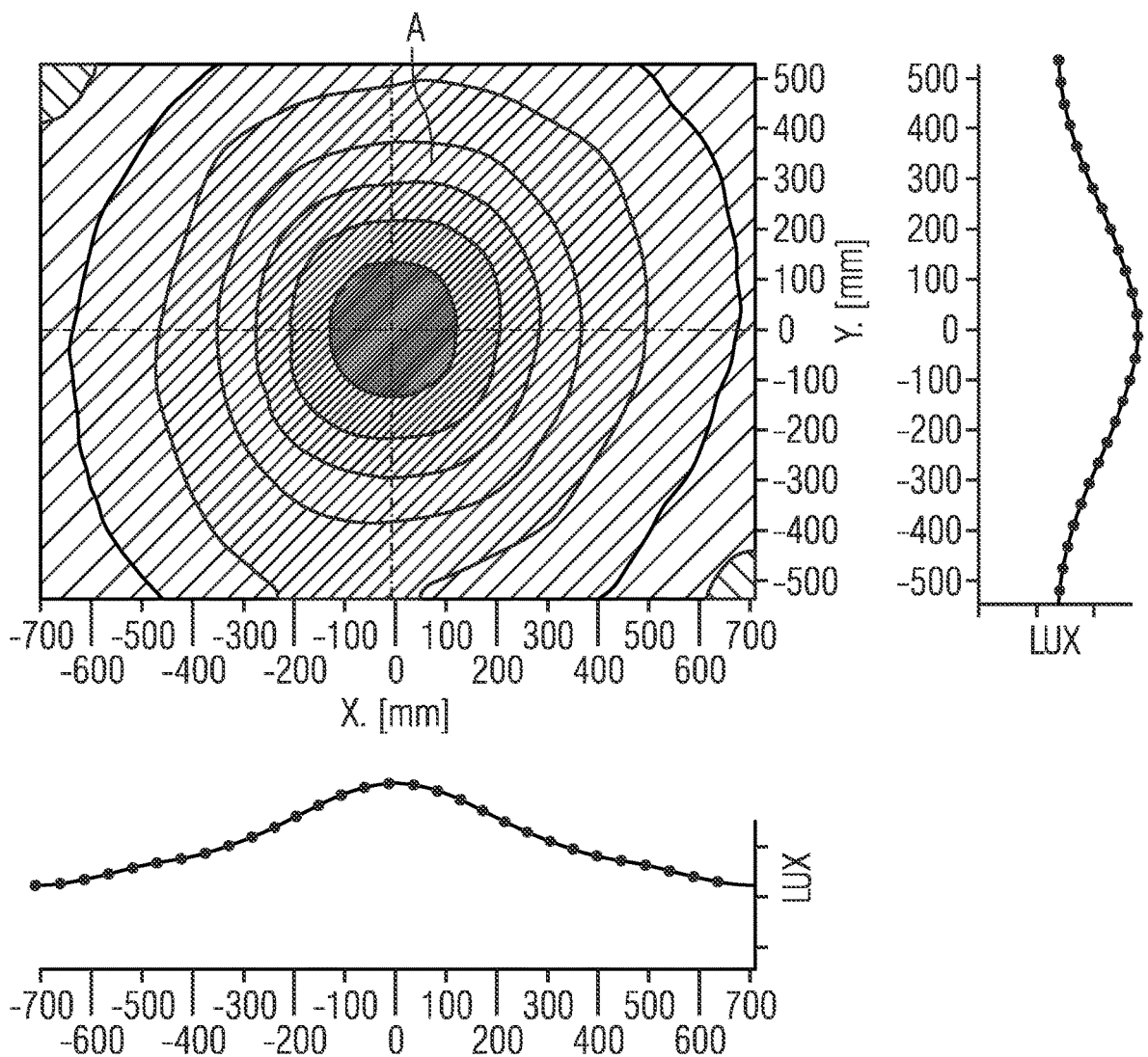
FIG. 4B shows illustrations of emission properties of an example of a luminaire described here.

FIG. 4B shows an illuminance distribution using the lens shown in FIGS. 2A, 2B and 3, wherein the average edge length D is 0.75 mm. The illuminance intensities are determined at a distance of 1 m from the luminaire 1. At the top left, a sectional view of the illumination field A is shown, i.e. in the XY plane. At the bottom left in the FIG. 4B, a section along the Y-axis is shown and at the top right, a section along the X-axis. A schematic scaling is shown in FIG. 4B at the bottom right.

My lens and luminaries described herein are not restricted to the description of the examples. This disclosure rather comprises any novel feature and any combination of features, including in particular any combination of features in the appended claims, even if the feature or combination is not itself explicitly indicated in the claims or in examples.

This application claims priority of DE 10 2016 109 647.4, the subject matter of which is incorporated herein by reference.

The invention claimed is:

1. A lens that spreads light from a point light source comprising:
    a light entry side having a first Fresnel structure,
    a light exit side having a second Fresnel structure different from the first Fresnel structure,
    a section plane located entirely between the first and second Fresnel structures so that the lens is flat, and
    a central axis as an optical axis perpendicular to the section plane,
    wherein
    a height of Fresnel rings of the first Fresnel structure, referred to the section plane, increases in the direction away from the central axis,
    the Fresnel rings of the first Fresnel structure each have an entry surface facing towards the central axis and a deflecting surface facing away from the central axis,
    Fresnel rings of the second Fresnel structure each have a mirror surface facing towards the central axis and an exit surface facing away from the central axis,
    a respective optically inactive zone is located between the Fresnel rings of the second Fresnel structure, and
    widths of the optically inactive zones increase in the direction away from the central axis.

2. The lens according to claim 1, wherein the deflecting surfaces and the mirror surface are each configured for total reflection of light, and
    the Fresnel rings of the first and second Fresnel structures each run concentrically about the central axis.

3. The lens according to claim 1, wherein the optically inactive zones are formed by circular ring-shaped surfaces, tips of the Fresnel rings of the first Fresnel structure are located in the region of the optically inactive zones when these tips are projected parallel to the central axis onto the optically inactive zones.

4. The lens according to claim 1, wherein, when viewed in cross-section, the deflecting surfaces are convexly and the mirror surface concavely curved, and the entry surface and the exit surface run straight when viewed in cross-section.

5. The lens according to claim 1, wherein all transitions between adjacent surfaces are rounded,
    a rounding radius is 5 µm to 30 µm, and
    a diameter of the light entry side is 1 mm to 8 mm.

6. The lens according to claim 1, wherein tips of the Fresnel rings of the second Fresnel structure are located in a plane parallel to the section plane, and
    within a tolerance of at most 10% of the height of the respective Fresnel ring, the heights of the Fresnel rings of the first Fresnel structure increase in the direction away from the central axis in accordance with a parabola.

7. A luminaire comprising:
    the lens according to claim 1, and
    a light-emitting LED chip as a point light source with an average edge length,
    wherein
    the point light source is located on the central axis on the light entry side, and
    along the central axis, a distance between the light entry side and the point light source is at least 20% and at most 90% of the average edge length.

8. The luminaire according to claim 7, wherein tips of the Fresnel rings of the second Fresnel structure are located in a plane parallel to the section plane,
    within a tolerance of at most 10% of the height of the respective Fresnel ring, the heights of the Fresnel rings of the first Fresnel structure increase in the direction away from the central axis in accordance with a parabola,
    for the heights h of the individual Fresnel rings of the first Fresnel structure, referred to a distance d in the direction away from the central axis and referred to the mean edge length D, the relationship applies:

$h(d)=0.12(d/D)^2+0.06(d/D)$, wherein the tolerance additionally amounts to at most 10% of the mean edge length D.

9. The luminaire according to claim 8, wherein the following relationships apply for a distance Vn of the n-th tip of the Fresnel rings of the first Fresnel structure and for a distance Wn of the n-th tip of the Fresnel rings of the second Fresnel structure:

$Vn=(0.1+0.3n)D\pm 0.05D$ and $Wn=(0.4+0.4n+0.14n2)D\pm 0.05D$, wherein n is a natural number of 1 to 6 and the distances Vn, Wn are determined in the direction perpendicular to the central axis, and
    the first and second Fresnel structures have the same number of Fresnel rings.

10. The luminaire according to claim 7, wherein the light entry side within the first Fresnel ring of the first Fresnel structure is formed by a converging lens, and
    the light exit side within the first Fresnel ring of the second Fresnel structure is formed to be planar.

11. The luminaire according to claim 8, wherein a distance between the outermost Fresnel ring of the first Fresnel structure and a main emission side facing the light entry side is at least 5% and at most 25% of the mean edge length D, measured in the direction parallel to the central axis.

12. The luminaire according to claim 11, wherein the point light source exhibits a Lambertian radiation characteristic on a main emission side facing the light entry side,
    during operation of the point light source, the Fresnel rings of the second Fresnel structure radiate luminous fluxes of equal magnitude, with a relative deviation of at most 20% from each other, and the lens comprises a mounting socket and together with an assembly platform completely encloses the point light source so that the lens serves as a housing for the point light source.

13. The luminaire according to claim 7, which is built into a mobile image recording device and is configured as a flashlight.

14. A lens that spreads light from a point light source comprising:
a light entry side having a first Fresnel structure,
a light exit side having a second Fresnel structure different from the first Fresnel structure,
a section plane located entirely between the first and second Fresnel structures so that the lens is flat, and
a central axis as an optical axis perpendicular to the section plane,
wherein
a height of Fresnel rings of the first Fresnel structure, referred to the section plane, increases in the direction away from the central axis,
the Fresnel rings of the first Fresnel structure each have an entry surface facing towards the central axis and a deflecting surface facing away from the central axis,
Fresnel rings of the second Fresnel structure each have a mirror surface facing towards the central axis and an exit surface facing away from the central axis, and
when viewed in cross-section, the deflecting surfaces are convexly and the mirror surface concavely curved, and the entry surface and the exit surface run straight when viewed in cross-section.

15. A lens that spreads light from a point light source comprising:
a light entry side having a first Fresnel structure,
a light exit side having a second Fresnel structure different from the first Fresnel structure,
a section plane located entirely between the first and second Fresnel structures so that the lens is flat, and
a central axis as an optical axis perpendicular to the section plane,
wherein
a height of Fresnel rings of the first Fresnel structure, referred to the section plane, increases in the direction away from the central axis,
the Fresnel rings of the first Fresnel structure each have an entry surface facing towards the central axis and a deflecting surface facing away from the central axis,
Fresnel rings of the second Fresnel structure each have a mirror surface facing towards the central axis and an exit surface facing away from the central axis,
tips of the Fresnel rings of the second Fresnel structure are located in a plane parallel to the section plane, and
within a tolerance of at most 10% of the height of the respective Fresnel ring, the heights of the Fresnel rings of the first Fresnel structure increase in the direction away from the central axis in accordance with a parabola.

* * * * *